United States Patent
Nozawa

(10) Patent No.: US 8,579,456 B2
(45) Date of Patent: Nov. 12, 2013

(54) BACKLIGHT UNIT

(75) Inventor: Shinnosuke Nozawa, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/805,791

(22) PCT Filed: May 23, 2011

(86) PCT No.: PCT/JP2011/061723
§ 371 (c)(1),
(2), (4) Date: Dec. 20, 2012

(87) PCT Pub. No.: WO2012/005061
PCT Pub. Date: Jan. 12, 2012

(65) Prior Publication Data
US 2013/0100648 A1    Apr. 25, 2013

(30) Foreign Application Priority Data

Jul. 7, 2010   (JP) .................................. 2010-154672

(51) Int. Cl.
*G09F 13/04* (2006.01)
(52) U.S. Cl.
USPC ........................... 362/97.3; 362/560; 362/555
(58) Field of Classification Search
USPC ........................................ 362/97.3, 560, 555
See application file for complete search history.

(56) References Cited

U.S. PATENT DOCUMENTS

| | | | | |
|---|---|---|---|---|
| 7,275,852 B2* | 10/2007 | Kim et al. | ...................... | 362/612 |
| 8,240,865 B2* | 8/2012 | Park | .............................. | 362/97.3 |
| 2006/0104080 A1* | 5/2006 | Kim et al. | ...................... | 362/555 |
| 2006/0245208 A1 | 11/2006 | Sakamoto et al. | | |
| 2007/0103908 A1* | 5/2007 | Tabito et al. | ................... | 362/294 |
| 2008/0074060 A1* | 3/2008 | Ye et al. | ......................... | 315/307 |
| 2011/0096265 A1* | 4/2011 | Murakoshi et al. | ............. | 349/64 |

FOREIGN PATENT DOCUMENTS

JP    2006-332024 A    12/2006

OTHER PUBLICATIONS

Official Communication issued in International Patent Application No. PCT/JP2011/061723, mailed on Jun. 14, 2011.

* cited by examiner

*Primary Examiner* — Mary Ellen Bowman
(74) *Attorney, Agent, or Firm* — Keating & Bennett, LLP

(57) ABSTRACT

In order to accurately illuminate an object to be illuminated with planar light having little unevenness in intensity, a backlight unit (2) having a simple structure and simple assembly is provided with a reflection sheet (8) which covers a chassis (5) and a substrate (6) and which has through-holes (81) penetrated by light sources (7), wherein the through-holes (811) formed in the center become larger than the through-holes (814) formed at the edges.

20 Claims, 4 Drawing Sheets

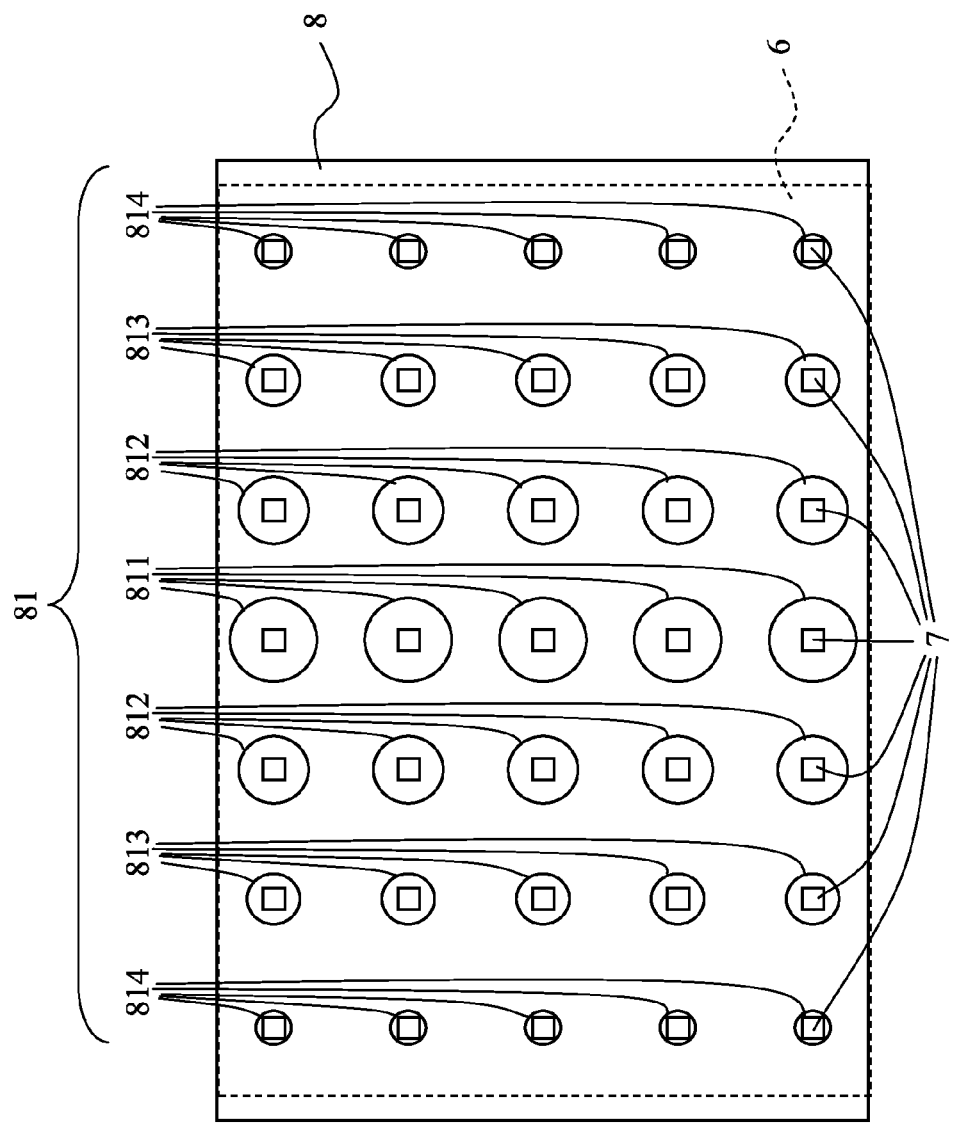

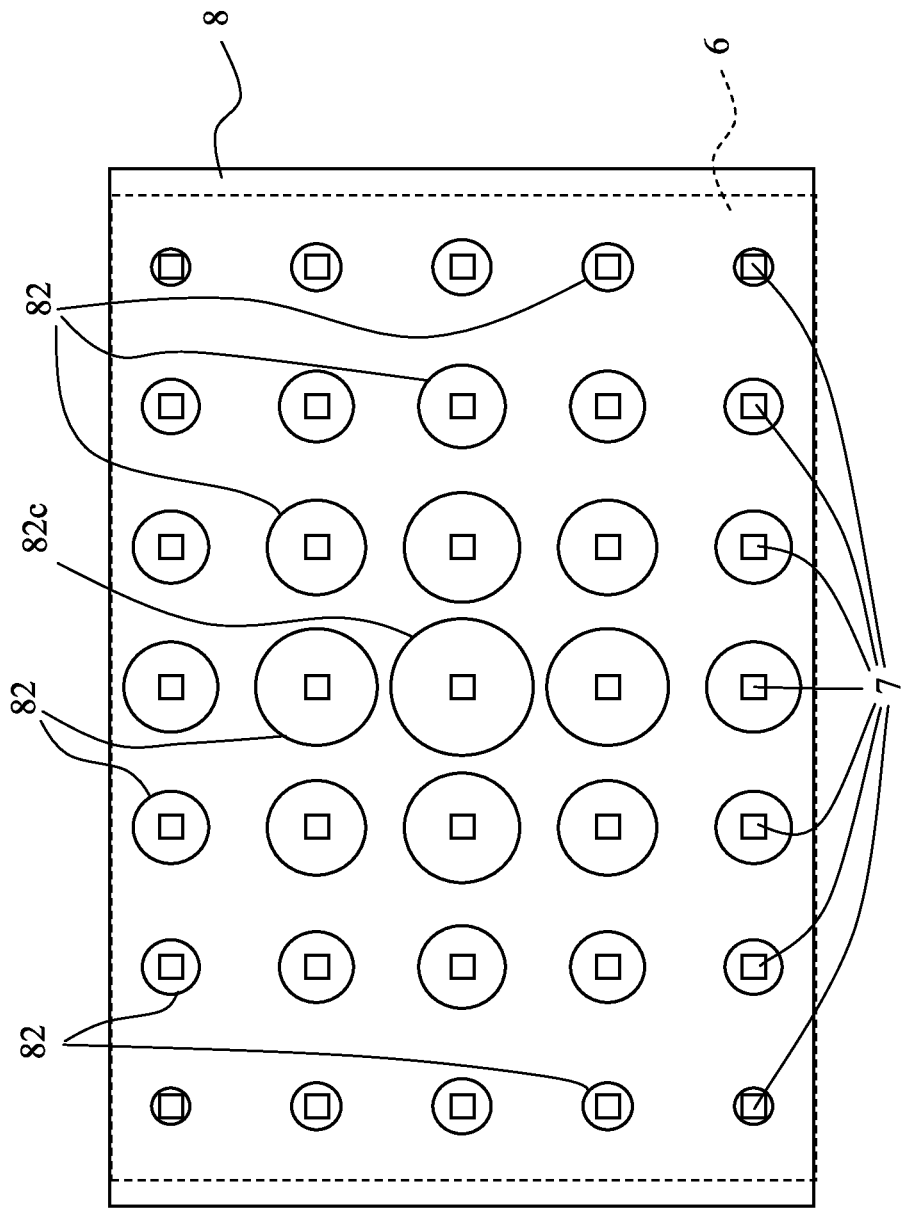

BACKLIGHT UNIT

TECHNICAL FIELD

The present invention relates to a backlight unit that supplies light to a non-luminous display panel such as a liquid crystal display panel.

BACKGROUND ART

In recent years, a liquid crystal display device is often adopted as a display device for a monitor of a notebook-sized personal computer, a television receiver, or the like. The liquid crystal display device includes a liquid crystal display panel and a backlight unit that is disposed behind the liquid crystal display panel. In the liquid crystal display device, a transmittance (transmission amount) of light from the backlight unit is adjusted by the liquid crystal display panel, and a resulting image is formed on a front surface of the liquid crystal display panel.

As the backlight unit, there is increasingly used a type in which a plurality of LED lamps are arranged on a flat surface. The backlight unit includes a chassis that is an open box-shaped body, a substrate that is disposed at a bottom surface portion inside the chassis, a plurality of LED lamps that are mounted on the substrate, and a reflection sheet that is disposed inside the chassis so as to cover the substrate. The reflection sheet has a plurality of through holes, and the LED lamps penetrate through the through holes, respectively (see JP-A-2006-332024).

Most part of light from the LED lamps is used to directly irradiate the liquid crystal display panel on a front side, and remaining part of the light is reflected off the reflection sheet toward the liquid crystal display panel on the front side. The backlight unit irradiates an object to be irradiated (herein, the liquid crystal display panel) on the front side with planar light that is a combination of light emitted from the LED lamps and light emitted from the LED lamps and reflected off the reflection sheet.

LIST OF CITATIONS

Patent Literature
Patent Document 1: JP-A-2006-332024

SUMMARY OF THE INVENTION

Technical Problem

In the backlight unit including the LED lamps as light sources, the LED lamps are arranged at preset positions on the substrate. In a case of a backlight unit of this type in which the LED lamps are arranged on the substrate (on a flat surface), the density of light of the LED lamps tends to be higher in the vicinity of a center of the backlight unit and lower in the vicinities of four corners and four sides (end portions) thereof compared with that in the vicinity of the center. That is, the backlight unit disadvantageously emits planar light whose luminance is higher at a center portion of the backlight unit and lower at end portions thereof and thus is uneven.

In order to suppress such luminance unevenness of planar light as described above, there has been proposed a method in which the arrangement of the LED lamps mounted on the substrate is changed. Changing the arrangement of the LED lamps, however, makes it necessary that the structure (shape) of the substrate on which the LED lamps are mounted be changed and thus requires design change, rendering the manufacturing of the backlight unit troublesome and time-consuming.

With the foregoing in mind, it is an object of the present invention to provide a backlight unit that is easily manufactured and assembled and can irradiate an object to be irradiated with planar light reduced in luminance unevenness.

Solution to the Problem

In order to achieve the above-described object, the present invention provides a backlight unit that has: a chassis in a shape of a box having an opening; a substrate that is disposed on a bottom surface of the chassis and on which a plurality of light sources are mounted; and a reflection sheet that covers the chassis and the substrate and has a plurality of through holes through which the light sources penetrate, respectively. In the reflection sheet, those of the through holes that are formed on a center side of the reflection sheet are larger than those of the through holes that are formed on an end portion side of the reflection sheet.

According to this configuration, in the vicinity of a light source penetrating through a large through hole, the density of light reflected off a reflection sheet is lower compared with that in the vicinity of a light source penetrating through a small through hole. That is, in the backlight unit, the density of light reflected off the reflection sheet is lower at a center portion thereof and higher at end portions thereof. Meanwhile, the density of light emitted from the light sources is higher at the center portion and lower at the end portions. Thus, since light emitted from the backlight unit is planar light that is a combination of light emitted from the light sources and light reflected off the reflection sheet, the density of planar light emitted from the backlight unit is made uniform. As a result, luminance unevenness of planar light from the backlight unit used to irradiate an object to be irradiated is suppressed.

In the above-described configuration, the plurality of light sources may be mounted on the substrate so that every vertically and laterally adjacent ones of the light sources are at an equal distance from each other. Furthermore, the plurality of light sources may be mounted at locations on the substrate where they are in line symmetry with respect to a center line of a mounting surface of the substrate, or at locations on the substrate where they are in point symmetry with respect to a center of a mounting surface of the substrate.

In the above-described configuration, each different one of the plurality of light sources may penetrate through each of the plurality of through holes. Furthermore, in a case where the through holes are of a large size, a plurality of adjacent ones of the light sources may penetrate through a single one of the through holes.

In the above-described configuration, in the reflection sheet, the plurality of through holes may be formed so as to be in line symmetry. Furthermore, in the reflection sheet, the plurality of through holes may be formed so as to be in point symmetry about one of the through holes through which one of the light sources mounted at a center of the substrate penetrates.

In the above-described configuration, a shape of the plurality of through holes of the reflection sheet may be decided depending on a shape of the light sources mounted on the substrate.

The plurality of light sources may be constituted by an LED lamp including one or a plurality of LED elements or by an electric light bulb. Furthermore, in addition to these, any of a wide range of types of light sources each including a light emitting element that emits light by using electric power can be adopted.

Furthermore, the backlight unit according to the present invention can be used as a planar illumination device for a liquid crystal display device. Furthermore, without any limitation to a liquid crystal display device, the backlight unit can be used also as a backlighting device for a non-luminous transmission type image display device. Moreover, the backlight can be used also as an illumination device that emits planar light to illuminate a predetermined area.

Advantageous Effects of the Invention

According to the present invention, there can be provided a backlight unit that is easily manufactured and assembled and can irradiate an object to be irradiated with planar light reduced in luminance unevenness.

BRIEF DESCRIPTION OF DRAWINGS

FIG. 3 A front view of one example of a reflection sheet used in the backlight unit according to the present invention.

FIG. 4 A front view of another example of the reflection sheet used in the backlight unit according to the present invention.

DESCRIPTION OF EMBODIMENTS

Figure 1:
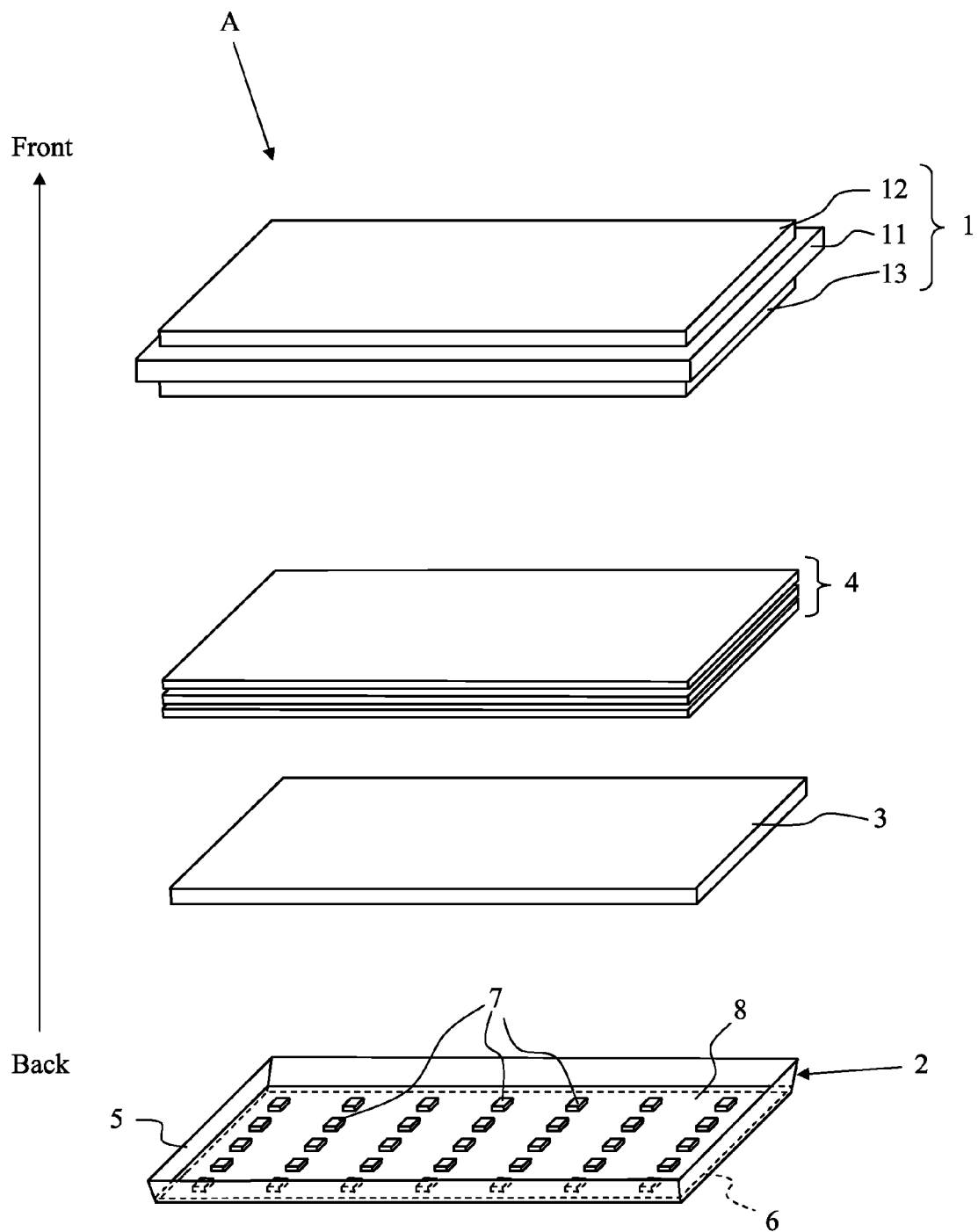
FIG. 1 An exploded perspective view showing, as one example, a liquid crystal display device including a backlight unit according to the present invention.

Hereinafter, embodiments of the present invention will be described with reference to the appended drawings. FIG. 1 is an exploded perspective view showing, as one example, a liquid crystal display device including a backlight unit according to the present invention. As shown in FIG. 1, a liquid crystal display device A includes a liquid crystal display panel 1 and a backlight unit 2 that is disposed behind the liquid crystal display panel 1.

The liquid crystal display panel 1 has a liquid crystal panel 11 in which liquid crystal is sealed, a polarization plate 12 that is attached to a front surface (a viewer side) of the liquid crystal panel 11, and a polarization plate 13 that is attached to a back surface (a backlight unit 2 side) of the liquid crystal panel 11. The liquid crystal panel 11 includes an array substrate that includes a switching element such as a TFT (thin film transistor) or the like, an opposed substrate that is disposed so as to be opposed to the array substrate and on which a color filter is formed, and liquid crystal that is filled between the array substrate and the opposed substrate (none of these are shown). The liquid crystal panel 11 may have a configuration in which a color filter is formed on the array substrate, and a transparent electrode is formed on the opposed substrate.

As shown in FIG. 1, in the liquid crystal display device A, between the liquid crystal display panel 1 and the backlight unit 2, a diffusion plate 3 and an optical sheet unit 4 are sequentially disposed in order from the backlight unit 2 side.

The diffusion plate 3 is mounted so as to cover a front surface of the backlight unit 2. The diffusion plate 3 receives light from the backlight unit 2 and diffuses (scatters) the light. That is, light from the backlight unit 2, upon incidence on the diffusion plate 3, is diffused (scattered) to be spread out in an in-plane direction.

In the liquid crystal display device A shown in FIG. 1, the optical sheet unit 4 includes three optical sheets, but there is no limitation thereto. The optical sheet unit 4 may include an increased number of optical sheets or may be composed of a decreased number of optical sheets. The optical sheet unit 4 includes, for example, a diffusion sheet, a lens sheet, and so on. The diffusion sheet has the same function as that of the diffusion plate 3 and is thinner than the diffusion plate 3. The lens sheet is a sheet that deflects a radiation property of light (condenses light), and light incident thereon is condensed, so that a light emission luminance per unit area is improved. There are cases where optical sheets of types other than these are used.

Light emitted from the backlight unit 2 is diffused while being transmitted through the diffusion plate 3 and then becomes incident on the optical sheet unit 4. The light that has become incident on the optical sheet unit 4 is further diffused and condensed to have an increased light emission luminance and then becomes incident on the liquid crystal display panel 1.

Figure 2:
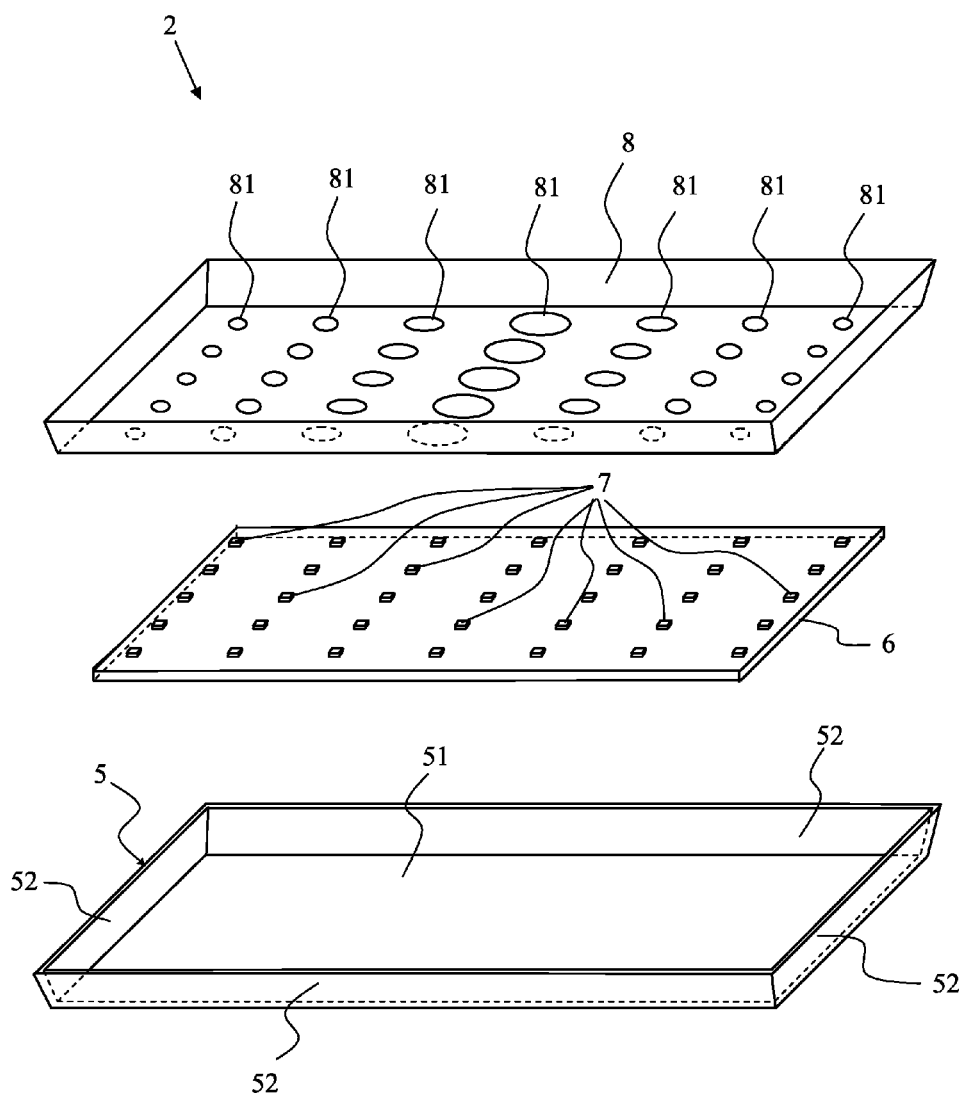
FIG. 2 An exploded perspective view of the backlight unit used in the liquid crystal display device shown in FIG. 1.

A detailed description is given of the backlight unit 2 with reference to the appended drawings. FIG. 2 is an exploded perspective view of the backlight unit used in the liquid crystal display device shown in FIG. 1. The backlight unit 2 is a direct type illumination device in which light sources are disposed in array form on a back side of the liquid crystal display panel 1. As shown in FIG. 2, the backlight unit 2 includes a backlight chassis 5 that is a chassis, a substrate 6 that is held in the backlight chassis 5, LED lamps 7 that are light sources mounted on the substrate 6, and a reflection sheet 8 that is mounted to the backlight chassis 5.

As shown in FIG. 2, the backlight chassis 5 has a rectangular bottom surface portion 51 and a side wall portion 52 that is formed to rise from each of four sides of the bottom surface portion 51. The substrate 6 on which the LED lamps 7 are mounted is mounted and fixed to the bottom surface portion 51 of the backlight chassis 5. The substrate 6 is a rectangular substrate that supplies electric power to the LED lamps 7. On the substrate 6, the LED lamps 7 are mounted in a state of being arranged in a matrix array.

The LED lamps 7 may be each constituted by a white LED lamp including a blue LED element and a yellow phosphor cover or may be each composed of LED elements of RGB colors. In describing the backlight unit 2, it is assumed as an example that, on the substrate 6, 35 LED lamps 7 in total are arranged in a matrix array of five rows and seven columns where they are equally spaced vertically and horizontally from each other. The backlight unit described herein represents one example, and backlight units in practical use vary in number of LED lamps used and in aspect ratio depending on an intended size of planar light to be obtained (the size of a liquid crystal display panel as an object to be irradiated).

The reflection sheet 8 is a sheet-shaped member that is mounted and fixed to the side wall portions 52 and the bottom surface portion 51 of the backlight chassis 5 and covers the substrate 6. The reflection sheet 8 has through holes 81 through which the LED lamps 7 penetrate, respectively. The reflection sheet 8 reflects a part of light emitted from the LED lamps 7, which travels toward the back side, to a front side. As the reflection sheet 8, typically used is a white sheet, and the reflection sheet 8 is fixed to the backlight chassis 5 in such a way as to be prevented from floating up therefrom. The reflection sheet is fixed by, for example, a method in which, by use of a double-faced adhesive sheet, a rear surface of the reflection sheet is bonded to any of the bottom surface portion 51, the side wall portions 52, and the substrate 6 fixed to the bottom surface portion 51.

With reference to the appended drawings, a description is given of one example of the reflection sheet used in the backlight unit according to the present invention. FIG. 3 is a front view of one example of the reflection sheet used in the backlight unit according to the present invention. A reflection sheet 8 shown in FIG. 3, though only a rectangular portion thereof, which covers the bottom surface portion 51 and the substrate 6, is shown, in fact, has also a portion that is integrally connected to each of sides of the rectangular portion and covers the side wall portion 52.

The reflection sheet 8 has circular through holes 81 that are formed at positions corresponding to the 35 LED lamps 7 mounted on the substrate 6, respectively. When the reflection sheet 8 is disposed in the backlight chassis 5, the LED lamps 7 are exposed to a front side through the through holes 81, respectively. For the sake of convenience, in the reflection sheet 8 shown in FIG. 3, among the through holes 81, those formed in a center column in a longer side direction of the reflection sheet 8 are each indicated as a first through hole 811, and in order toward each end portion of the reflection sheet 8 in the longer side direction, those in a column closest to the center column, those in a column second closest thereto, and the rest in a column fourth closest thereto are each indicated as a second through hole 812, a third through hole 813, and a fourth through hole 814, respectively.

As shown in FIG. 3, in the reflection sheet 8, the first through hole 811 in the center column is the largest, and the size of the through holes 81 decreases in a direction toward each end of the reflection sheet 8 in the longer side direction (lateral direction in FIG. 3). That is, of the plurality of through holes 81, the through hole 811 is the largest, and the size of the through holes 81 decreases in the order of the second through hole 812, the third through hole 813, and the fourth through hole 814, which, therefore, is the smallest. The size of the through holes 81, however, does not vary in a shorter side direction of the reflection sheet 8 (vertical direction in FIG. 3). This means that all the through holes arranged in each column in the shorter side direction are the same in size.

That is, on the reflection sheet 8, a ratio of the area of a reflection surface per unit area is lowest at the periphery of the first through hole 811 and highest at the periphery of the fourth through hole 814. That is, in the vicinity of the first through hole 811, since the ratio of the area of the reflection sheet 8 per unit area is low, the density of light emitted from the LED lamps 7 and reflected off the reflection sheet 8 is low. The density of light emitted from the LED lamps 7 and reflected in the vicinities of the through holes 812 and 813 becomes higher in an outward direction on the reflection sheet 8. The density of light emitted from the LED lamps 7 and reflected in the vicinity of the fourth through hole 814 is the highest.

By adjusting the size of the through holes 81 of the reflection sheet 8 as described above, the density of light reflected off the reflection sheet 8 can be set to be lower at a center portion of the reflection sheet 8 and higher at end portions (vicinities of four corners and sides) thereof. Meanwhile, in a case where the LED lamps 7 are arranged on a flat surface, the density of direct light emitted from the LED lamps 7 is higher at a center portion of the flat surface and lower at end portions thereof. Thus, since planar light emitted from the backlight unit 2 is a combination of direct light emitted from the LED lamps 7 and light reflected off the reflection sheet 8, the density of planar light emitted from the backlight unit 2 is made uniform. As a result, luminance unevenness of planar light emitted from the backlight unit 2 is suppressed.

As described above, simply by changing the size of the through holes 81 formed through the reflection sheet 8, the backlight unit 2 can be configured to emit planar light in which luminance unevenness is suppressed. Thus, compared with a configuration in which luminance unevenness is suppressed by changing the shape of the backlight chassis 5 or by changing the arrangement of the LED lamps 7 mounted on the substrate 6, the degree of required change in the manufacturing and assembly processes is small, so that designing and manufacturing are made easier. Furthermore, since the degree of required change in designing is small, and the degree of required change in the manufacturing and assembly processes is also small, the cost of manufacturing the backlight unit 2 can be reduced.

With reference to the appended drawings, a description is given of another example of the reflection sheet used in the backlight unit according to the present invention. FIG. 4 is a front view of the another example of the reflection sheet used in the backlight unit according to the present invention. Similarly to FIG. 3, a reflection sheet 8 shown in FIG. 4, though only a rectangular portion thereof, which covers the bottom surface portion 51 and the substrate 6, is shown, in fact, has also a portion that is integrally connected to each of sides of the rectangular portion and covers the side wall portion 52.

The reflection sheet 8 has circular through holes 82 that are formed at positions corresponding to the 35 LED lamps 7 mounted on the substrate 6, respectively. The through holes 82 have a circular shape. As shown in FIG. 4, the size of the through holes 82 decreases with increasing distance from a center of the reflection sheet 8 in a longer side direction thereof and also with increasing distance from the center in a shorter side direction thereof. The through holes 82 are formed so that, when the reflection sheet 8 is rotated 180 degrees about a through hole 82*c* that is one of the through holes 82 located at the center, those of the through holes 82 that are formed at positions symmetric with respect to the through hole 82*c* at the center coincide with each other, i.e. plural ones of the through holes 82 are formed in point symmetry with respect to the through hole 82*c* at the center.

In a case where the LED lamps 7 are arranged on a flat surface, the density of light emitted from the LED lamps 7 is highest at a center portion of the flat surface and decreases with increasing proximity to end portions (vicinities of four corners and four sides) thereof. When the backlight unit 2 emits planar light for illuminating a small area, since the length thereof in the longer side direction is longer than that in the shorter side direction, a decrease in the density of light is more likely to be pronounced in the longer side direction and less likely to be pronounced in the shorter side direction. On the other hand, when the backlight unit 2 emits planar light for illuminating a large area, a decrease in the density of light at the end portions is pronounced even in the shorter side direction. That is, even at a position distant in the shorter side direction from one of the LED lamps 7 at the center, a decrease in the density of light emitted from the LED lamps 7 is likely to be perceived.

As a solution to this, as in the reflection sheet 8 shown in FIG. 4, the reflection sheet 8 is configured to have the through holes 82 whose size is smaller on an end portion side than on a center side in each of the longer side direction and the shorter side direction so that, on the reflection sheet 8, a ratio of the area of a reflection surface per unit area is lower at a center portion thereof and higher at end portions thereof in each of the longer side direction and the shorter side direction. That is, the density of light emitted from the LED lamps 7 and reflected off the reflection sheet 8 is lowest at the periphery of the through hole 82*c* at the center and high at the peripheries of those of the through holes 82 that are located far from the through hole 82c in each of the longer side direction and the shorter side direction.

With this configuration, since planar light emitted from the backlight unit 2 is a combination of light emitted from the LED lamps 7 and light reflected off the reflection sheet 8, the density of planar light emitted from the backlight unit 2 is made uniform. As a result, luminance unevenness of planar light emitted from the backlight unit 2 is suppressed.

Furthermore, by using the reflection sheet 8 having the plurality of through holes 82 whose size varies both in the longer side direction and in the shorter side direction, compared with the case of using the reflection sheet 8 having the plurality of through holes 81 whose size varies only in the longer side direction, luminance variation can be more finely corrected, and thus planar light with a higher level of luminance uniformity can be used for irradiation.

Furthermore, the plurality of through holes 82 are formed so as to be in point symmetry about the through hole 82c at the center, so that even when the reflection sheet 8 is mounted in a state where it is rotated 180 degrees, the same effect of suppressing luminance unevenness can be exerted. Thus, in mounting the reflection sheet 8 to the backlight chassis 5 and to the substrate 6, it is not necessary to precisely check the orientation of the reflection sheet 8, thereby allowing trouble required for assembly to be reduced accordingly.

The foregoing backlight unit mainly refers to a type used in a liquid crystal display device but is not limited thereto and can be used as an illumination device that irradiates an object to be irradiated with planar light. Furthermore, while an LED lamp including an LED element is used as each of the light sources, there is no limitation thereto, and an electric light bulb can be used instead. Furthermore, in addition to these, any of a wide range of types of light sources that can be disposed in array form on a substrate and each include a light emitting element that emits light by using electric power can be adopted.

Furthermore, while in the foregoing backlight unit, the LED lamps (light sources) are arranged in lattice form where they are equally spaced vertically and laterally from each other, there is no limitation thereto. The LED lamps (light sources) may be mounted at locations on the substrate where they are in line or point symmetry. In such a case, luminance unevenness can be suppressed by this disposition of the LED lamps and further suppressed by the effect of the reflection sheet, and thus a higher level of luminance uniformity of planar light can be achieved.

While the foregoing discussion describes an exemplary case where in the reflection sheet, the plurality of through holes are formed so as to be in line or point symmetry, there is no limitation thereto as long as those of the through holes on the center side are formed to be larger than those on the end portion side. Furthermore, while the through holes are described as having a circular shape, there is no limitation thereto, and through holes having any of a wide range of shapes that allow each of the LED lamps (light sources) to penetrate therethrough can be adopted. The through holes may be set to have a square shape in a case where light source LED lamps (light sources) that penetrate therethrough, respectively, have a square shape and a rectangular shape in a case where the light source LED lamps (light sources) have a rectangular shape, i.e. they may be set to have the same shape as that of the light source LED lamps (light sources).

Furthermore, while in each of the foregoing examples, a single one of the LED lamps (light sources) penetrates through a single one of the through holes, there is no limitation thereto. In a case of through holes of a sufficiently large size, a configuration may be adopted in which plural ones of the LED lamps (light sources) penetrate through a single one of the through holes. This can reduce a total number of through holes to be formed through the reflection sheet, thereby allowing trouble and time required for manufacturing to be reduced accordingly. The configuration of the reflection sheet (the size and number of the through holes) can be decided, for example, in a manner that a difference in density of light emitted from the LED lamps 7 mounted on the substrate between at the center portion and at the end portions is determined in advance, and the size and number of the through holes are decided so that the difference is cancelled out.

INDUSTRIAL APPLICABILITY

The present invention is applicable to a display device for an apparatus such as a thin television apparatus, a thin display apparatus, a mobile phone, or the like. Furthermore, the present invention is applicable also as an illumination device that emits planar light.

LIST OF REFERENCE SYMBOLS

1 Liquid Crystal Display Panel
2 Backlight Unit
3 Diffusion Plate
4 Optical Sheet Unit
5 Backlight Chassis (chassis)
51 Bottom Surface Portion
52 Side Wall Portion
6 Substrate
7 LED Lamp
8 Reflection Sheet
81 Through Hole
82 Though Hole

The invention claimed is:

1. A backlight unit, comprising:
a chassis in a shape of a box having an opening;
a substrate that is disposed on a bottom surface of the chassis and on which a plurality of light sources are mounted; and
a reflection sheet that covers the chassis and the substrate and has a plurality of through holes through which the light sources penetrate, respectively,
wherein
in the reflection sheet, those of the through holes that are formed on a center side of the reflection sheet are larger than those of the through holes that are formed on an end portion side of the reflection sheet.

2. The backlight unit according to claim 1, wherein
the plurality of light sources are mounted on the substrate so that every vertically and laterally adjacent ones of the light sources are at an equal distance from each other.

3. The backlight unit according to claim 1, wherein
the plurality of light sources are mounted at locations on the substrate where they are in line symmetry with respect to a center line of a mounting surface of the substrate.

4. The backlight unit according to claim 1, wherein
the plurality of light sources are mounted at locations on the substrate where they are in point symmetry with respect to a center of a mounting surface of the substrate.

5. The backlight unit according to claim 1, wherein
in the reflection sheet, the plurality of through holes are formed so as to be in line symmetry.

6. The backlight unit according to claim 3, wherein
in the reflection sheet, the plurality of through holes are formed so as to be in line symmetry.

7. The backlight unit according to claim 4, wherein
in the reflection sheet, the plurality of through holes are formed so as to be in line symmetry.

8. The backlight unit according to claim 1, wherein
in the reflection sheet, the plurality of through holes are formed so as to be in point symmetry about one of the through holes through which one of the light sources mounted at a center of the substrate penetrates.

9. The backlight unit according to claim 3, wherein
in the reflection sheet, the plurality of through holes are formed so as to be in point symmetry about one of the through holes through which one of the light sources mounted at a center of the substrate penetrates.

10. The backlight unit according to claim 4, wherein
in the reflection sheet, the plurality of through holes are formed so as to be in point symmetry about one of the through holes through which one of the light sources mounted at a center of the substrate penetrates.

11. The backlight unit according to claim 1, wherein
each different one of the plurality of light sources penetrates through each of the plurality of through holes.

12. The backlight unit according to claim 5, wherein
each different one of the plurality of light sources penetrates through each of the plurality of through holes.

13. The backlight unit according to claim 8, wherein
each different one of the plurality of light sources penetrates through each of the plurality of through holes.

14. The backlight unit according to claim 1, wherein
a shape of the plurality of through holes of the reflection sheet is decided depending on a shape of the light sources mounted on the substrate.

15. The backlight unit according to claim 1, wherein
the light sources are constituted by an LED lamp including one or a plurality of LED elements.

16. The backlight unit according to claim 1, wherein
the light sources are constituted by an electric light bulb.

17. A liquid crystal display device comprising the backlight unit according to claim 1.

18. A liquid crystal display device comprising the backlight unit according to claim 15.

19. An illumination device comprising the backlight unit according to claim 1.

20. An illumination device comprising the backlight unit according to claim 15.

* * * * *